Nov. 4, 1958 F. W. SCHMIDT, JR., ET AL 2,859,420

TUNING DEVICE

Original Filed June 20, 1951

INVENTORS
FRED W. SCHMIDT, JR.
SYLVESTER A. DE MARS

BY Darby & Darby
ATTORNEYS

United States Patent Office 2,859,420

Patented Nov. 4, 1958

2,859,420

TUNING DEVICE

Fred W. Schmidt, Jr., Cedar Grove, and Sylvester A. De Mars, Ridgewood, N. J., assignors to Allen B. Du Mont Laboratories, Inc., Clifton, N. J., a corporation of Delaware

Original application June 20, 1951, Serial No. 232,537, now Patent No. 2,767,381, dated October 16, 1956. Divided and this application February 29, 1956, Serial No. 568,954

1 Claim. (Cl. 336—77)

This invention relates to an electric tuning element for resonating radio frequency energies at various selectable frequencies, particularly useful for television.

This application is a division of our issued Patent No. 2,767,381 issued on October 16, 1956.

It is among the objects of the invention to provide a tuner for radio frequency energies which is compact, easily constructed, economical, which has a wide tuning range, and which avoids the use of sliding contacts. Other objects will be apparent.

Figure 2:
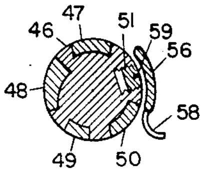
Figure 2 is a cross-sectional view through 2—2 of Figure 1.
Figure 1:
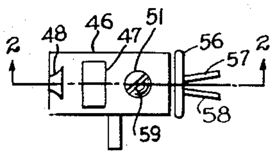
Figure 1 is a top elevational view of an alternative embodiment of the invention.

Modifications of the shape of the tuning elements on the surface of the rotatable cylinder are shown in Figures 1 and 2. As illustrated, one element 47 may be substantially square in shape. A second element 48 has a longer dimension circumferentially about the surface of the cylinder 17. A third tuning element 49 may be relatively small in area as compared to the other tuning elements on the cylinder. A fourth tuning element 50 may be used having a different dimension or shape, depending upon the particular tuning and tracking desired. A fifth tuning element 51 is shown comprising a threaded metallic element which when rotated will move radially so as to vary in its radial position relative to the outer surface of the cylinder 17.

Although the rotatable tuning cylinder of our above-mentioned issued patent is described as preferably being an insulative member having conductive tuning elements attached thereto, it has been found satisfactory to construct the rotatable cylinder of a ferrous material and to attach to a portion of and overlying the surface thereof a non-ferrous tuning element, of the desired shape, by any known means. Alternatively, the cylinder may be made of a non-ferrous material and a portion of the peripheral surface thereof may be overlain with a ferrous material.

Referring to Figures 1 and 2, the rotatable cylinder 46 may be employed in the manner of a detent-switch device whereby the cylinder "snaps" into place at each position of a tuning element adjacent the coil 56. Adjustable tuning may be provided for the tuning elements by the construction shown for the element 51 which comprises a cylindrically threaded screw of ferrous or non-ferrous material having a slot 59 by means of which said element 51 may be varied in radial position, thus adjusting the relative proximity of the element 51 to the coil 56 when in position with respect thereto. The center region of the spiral coil 56 may be left open to provide access with the adjusting tool to the tuning element 51 in order that the tuning of the coil may be adjusted while said element 51 is switched in position adjacent the coil.

For a more detailed description of the mode of operation attention is directed to our issued patent mentioned hereinabove.

While the present invention has been described in its basic form and in a preferred arrangement, it will be evident that alternative embodiments may be employed within the scope thereof.

What is claimed is:

Electrical tuning apparatus comprising an insulative cylinder, a coil of conductive material formed in a spiral shape and positioned adjacent the outer surface of said cylinder, at least one conductive member of ferrous material positioned adjacent the surface and occupying a portion of the periphery of and rotatable with said cylinder in axial alignment with said coil, at least one conductive member of non-ferrous material positioned in axial alignment with the position of said coil and adjacent said coil, said non-ferrous conductive member occupying a portion of said periphery of the cylinder other than the position occupied by said ferrous conductive member, some of said conductive members being radially threaded into said cylinder and having an adjustment means positioned on the outer surface thereof, and said coil having an opening near the center thereof through which an adjustment tool may be temporarily inserted to engage said adjusting means on said threaded members.

References Cited in the file of this patent

UNITED STATES PATENTS

| | | |
|---|---|---|
| 2,438,359 | Clapp | Mar. 23, 1948 |
| 2,489,645 | Jensen | Nov. 29, 1949 |

FOREIGN PATENTS

| | | |
|---|---|---|
| 906,009 | France | Apr. 30, 1945 |